(12) United States Patent
Shang

(10) Patent No.: US 7,630,399 B2
(45) Date of Patent: Dec. 8, 2009

(54) APPARATUS AND METHOD FOR RECOGNIZING FRAME CHECK SEQUENCE IN GENERIC FRAMING PROCEDURE ENCAPSULATION MODE

(75) Inventor: Qiuping Shang, Guangdong (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 632 days.

(21) Appl. No.: 11/350,148

(22) Filed: Feb. 8, 2006

(65) Prior Publication Data

US 2006/0193343 A1    Aug. 31, 2006

Related U.S. Application Data

(63) Continuation-in-part of application No. PCT/CN2004/000871, filed on Jul. 27, 2004.

(30) Foreign Application Priority Data

Aug. 8, 2003    (CN) .............................. 03 1 53318

(51) Int. Cl.
*H04J 3/22*    (2006.01)
(52) U.S. Cl. ..................... 370/466; 709/231; 709/232
(58) Field of Classification Search .............. 370/464, 370/465, 466; 709/230, 232
See application file for complete search history.

(56) References Cited

U.S. PATENT DOCUMENTS

| | | | |
|---|---|---|---|
| 5,889,817 A * | 3/1999 | Yoshida | 375/220 |
| 6,675,222 B1 * | 1/2004 | Petersen et al. | 709/232 |
| 7,139,243 B2 * | 11/2006 | Okumura | 370/248 |
| 7,298,694 B2 * | 11/2007 | Kamiya et al. | 370/218 |
| 2001/0043603 A1 | 11/2001 | Yu | |
| 2002/0090007 A1 | 7/2002 | Kamiya et al. | |

(Continued)

FOREIGN PATENT DOCUMENTS

CN    1149794    5/2004

(Continued)

OTHER PUBLICATIONS

International Search Report for International Application No. PCT/CN2004/00871, mailed Nov. 11, 2004.

(Continued)

*Primary Examiner*—William Trost, IV
*Assistant Examiner*—Siming Liu
(74) *Attorney, Agent, or Firm*—Summa, Additon & Ashe, P.A.

(57) ABSTRACT

The present invention discloses a method for recognizing a Frame Check Sequence (FCS) in Generic Framing Procedure (GFP) encapsulation mode, comprising: removing the Core Header field of a GFP frame in a received GFP data stream, generating the delimiting signals in connection with the removed data stream, indicating the head of the frame, the end of the frame and whether the frame data is valid, respectively; extracting the PFI information from the GFP frame according to the delimiting signals and removing the Payload Header of the GFP frame; judging whether the GFP frame contains an FCS field according to the extracted PFI information in Step B, if yes, determining the starting position of the FCS field and removing the FCS field; otherwise, outputting the GFP data stream directly and completing the current procedure. The present invention also discloses apparatus for recognizing an FCS in GFP encapsulation mode. The method and apparatus of the present invention can eliminate error codes and be flexibly used in many applications with high adaptability.

9 Claims, 5 Drawing Sheets

U.S. PATENT DOCUMENTS

2004/0252720 A1* 12/2004 Xiong et al. ................ 370/473

FOREIGN PATENT DOCUMENTS

CN            1226846       11/2005

OTHER PUBLICATIONS

English abstract of CN 1428971, published Jul. 9, 2003, http://v3.espacenet.com/textdoc? DB=EPODOC&IDX=CN1428971&F=0.
Office Action in corresponding Korean Application No. 10-2006-7002693, dated Dec. 1, 2006, with brief English translation.

* cited by examiner

APPARATUS AND METHOD FOR RECOGNIZING FRAME CHECK SEQUENCE IN GENERIC FRAMING PROCEDURE ENCAPSULATION MODE

CROSS-REFERENCE TO RELATED APPLICATIONS

This application is a continuation-in-part of PCT Application No. PCT/CN2004/000871, filed Jul. 27, 2004, pending, which designates the U.S., which is hereby incorporated herein by reference in its entirety, and which claims priority from Chinese Application No. 03153318.3, filed Aug. 8, 2003.

FIELD OF THE INVENTION

The present invention relates to framing procedures, and more specifically, to an apparatus and method for recognizing a Frame Check Sequence (FCS) in a Generic Framing Procedure (GFP) encapsulation mode.

BACKGROUND OF THE INVENTION

GFP is a new data link framing protocol, aimed primarily at block coding based on bit-synchronized transmission channels or packet-oriented data streams. GFP can allow flexible frame encapsulation to support fixed length data or variable length data, by implementing full encapsulation of variable-length user Protocol Data Units (PDU) and avoiding data splitting, data reforming and frame padding. This can simplify system operation and can improve processing speed and stability of a system. Unlike HDLC, however, which determines a frame boundary by padding the header with special characters, GFP uses a self-description technique based on Head Error Check (HEC), which delineates the frame boundary by 2-byte Payload Length and 2-byte HEC. As a result, GFP can overcome various shortcomings resulting from frame synchronization based on frame identification, thereby improving processing speeds and meeting the high-speed requirements of the next generation SDH.

As shown in FIG. 1, the structure of a GFP frame can include a Core Header, a Payload Header, Client Payload Information and a FCS. The Payload Header can further include four fields, namely, Payload Type (Type), Payload Type Error Check (tHEC), GFP Extension Header and Extension Header Error Check (eHEC).

The Type occupies 2 bytes, which indicate the content and format of the GFP payload information and includes a Payload Type Identification (PTI), a Payload FCS Identification (PFI), an Extension Header Identification (EXI) and a User Payload Identification (UPI). The PTI occupies 3 bits, which indicate the content type of the frame. The PFI occupies 1 bit, which indicates whether the frame carries the FCS at the end of the frame, wherein $1b$ denotes that FCS is carried, and $0b$ denotes that no FCS is carried. The EXI occupies 4 bits, which indicates the type of the extension header. The UPI occupies 8 bits, which indicates the data type of the user payload.

In communication networks, communicating partners need to exchange information. When a GFP encapsulation protocol is used, the transmitting side adopts the GFP protocol to implement full encapsulation of the payload while the receiving side needs to restore the client payload information, i.e., the receiving side needs to remove the fields other than the client payload information. However, because the FCS field is optional, some GFP frames carry the FCS field and some GFP frames do not carry a FCS field. Thus, the receiving side needs to identify whether there is an FCS field in the received GFP frame, and then remove other fields to obtain the payload correctly. At present, when the client payload information is being restored, many devices do not support the self-recognition function of the FCS field, but only support a certain fixed structure. For example, many devices only support the structure with an FCS field or the structure with no FCS field. This approach of receiving frames with a fixed structure cannot handle the circumstance when the transmitting side alternately or irregularly transmits GFP frames with FCS fields or without FCS field. This can result in inflexibility.

At present, FCS self-recognition can be implemented as well in an approach which involves both software and hardware. In this approach, before the transmitting side transmits a frame, the information in the Type field should be recorded by the software. When the receiving side receives the frame and identifies information in the Type field by the hardware, the receiving side transmits a corresponding alarm to the software to report the identified information. The software re-compares the received alarm information and the recorded Type-field information. If they do not match, then the software reconfigures the frame; otherwise, the software judges whether the frame includes an FCS field based on the recorded information. If yes, the FCS field is removed from the frame, but otherwise, the software does nothing. As the software configuration is adopted, error codes are inevitably produced using this approach and the processing speed thereof is slow. Moreover, when frames with FCS fields and frames with no FCS fields are transmitted alternately, the software must switch frequently, making the self-recognition process nearly impossible and correct separation of the payload unachievable. This again can result in little flexibility.

SUMMARY OF THE INVENTION

In view of the above, the present invention can provide an apparatus for recognizing a FCS in a GFP encapsulation mode, which can allow the receiving side to identify the FCS field in a GFP data stream quickly and with flexibility and then obtain the payload by removing other fields correctly.

The present invention can further provide a method for recognizing a FCS in a GFP encapsulation mode, which can allow the receiving side to identify the FCS field in a GFP data stream quickly and with flexibility.

The apparatus for recognizing a FCS in a GFP encapsulation mode in accordance with the present invention can include a Frame Delimitation Module, a Frame Header Identification and Stripping Module and an FCS Stripping Module, wherein:

the Frame Delimitation Module is used for receiving a GFP data stream including a GFP frame, removing a Core Header field of the GFP frame, generating delimiting signals indicating the head of the frame, the end of the frame and whether the frame data is valid, respectively, and outputting to a Core Header Identification and Stripping Module the GFP data stream accompanied by the delimiting signals with the Core Header field removed;

the Core Header Identification and Stripping Module is used for removing a Payload Header of the GFP frame, generating a PFI signal indicating whether the GFP frame contains an FCS field based on a sop signal in the delimiting signals, and outputting to the FCS Stripping Module the GFP data stream accompanied by the PFI signal with the Payload Header removed; and the FCS Stripping Module is used for determining the position of a FCS field based on the PFI signal and the delimiting signals, and removing the FCS field.

The method for recognizing a FCS in a GFP encapsulation mode provided by the present invention can include the following steps:

A. removing a Core Header field of a GFP frame in a received GFP data stream, generating delimiting signals associated with data removed from the GFP data stream indicating the beginning of the frame, the end of the frame and whether the frame data is valid, respectively, and implementing the delimitation of the GFP frame;

B. extracting a PFI from the GFP frame based on the delimiting signals, and removing a Payload Header of the GFP frame; and C. judging whether the GFP frame contains a FCS field based on the extracted PFI in Step B, and, if yes, determining the starting position of the FCS field and removing the FCS field; otherwise, directly outputting the GFP data stream and completing the current process.

In accordance with the present invention, each frame is handled by extracting from the Payload Header of the GFP frame information relating to whether an FCS field is carried so as to determine whether to perform the FCS stripping procedure. When frames with FCS fields and frames with no FCS field are transmitted alternately, the method in accordance with the present invention can recognize an FCS field quickly and flexibly, and can be highly adaptable without generating an error code. Moreover, the apparatus in accordance with the present invention can achieve a self-recognition function of the FCS using hardware only, thereby avoiding the disadvantage of slow process speed and error codes caused by software operations. As a result, the apparatus can be highly adaptable and can be flexibly used in many applications.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention includes judging whether a GFP frame carries a FCS field based on the PFI field in the Type field of the GFP frame. If yes, the invention includes determining the starting position of the FCS field and then stripping the FCS field. Otherwise, the FCS field is not stripped and the GFP data stream is outputted directly. An exemplary embodiment of the present invention is hereinafter described in detail with reference to the accompanying drawings.

Figure 1:
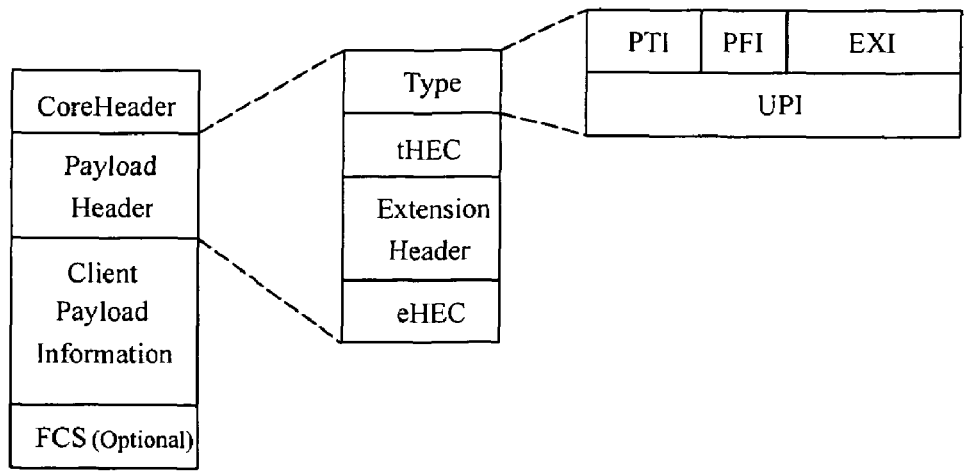
FIG. 1 is a schematic diagram illustrating the format of a GFP frame in the prior art.
Figure 2:
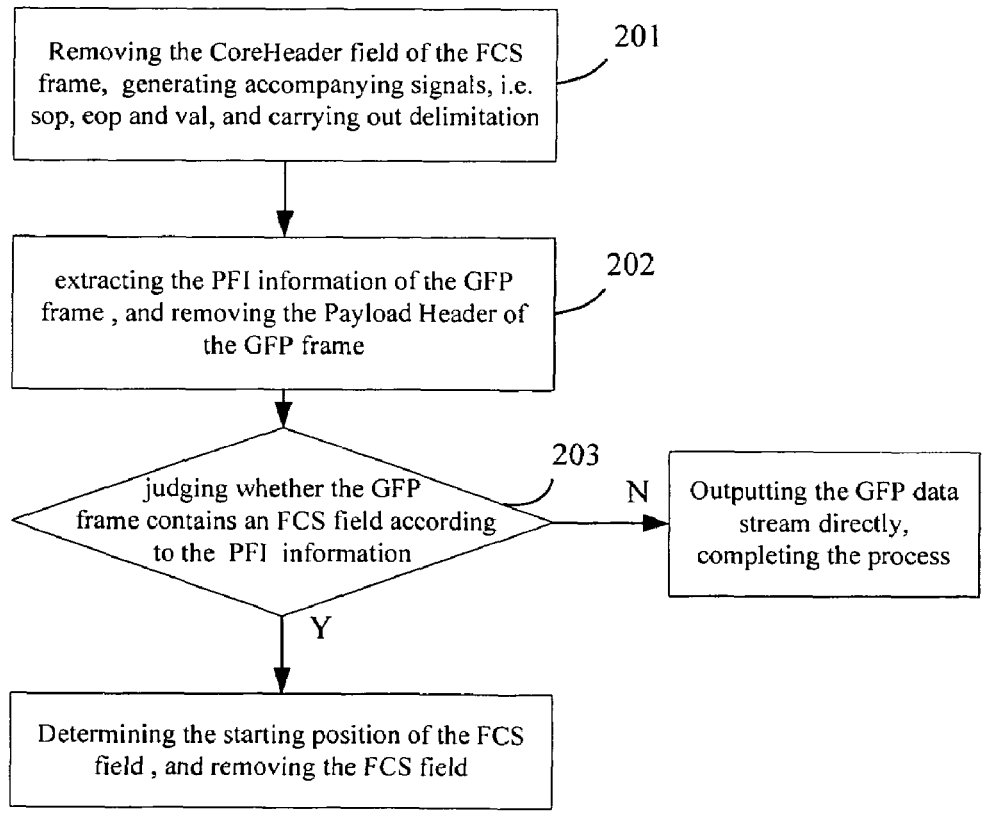
FIG. 2 is a flow chart illustrating the method according to an embodiment of the present invention.

As shown in FIG. 2, the method in accordance with an exemplary embodiment of the present invention can include the following steps:

Step 201: removing the Core Header field of the GFP frame in the received GFP data stream, generating the delimiting signals, sop, eop and val, with the GFP data without the Core Header, indicating the head of the frame, the end of the frame and whether the frame data is valid, respectively, and completing the delimitation of the GFP frame;

Step 202: extracting the PFI in the GFP frame based on the delimiting signals, and removing the Payload Header of the GFP frame;

Step 203: judging whether the GFP frame contains an FCS field based on the extracted PFI in Step 202, and, if yes, determining the starting position of the FCS field and removing the FCS field; otherwise, directly outputting the GFP frame and completing the current procedure.

The step of determining the starting position of the FCS field may be performed in two ways. One method can include measuring the length of the Payload during the frame delimitation process in Step 201, and then in Step 203, determining the starting position of the FCS field based on the length of the Payload. The other method can include determining in Step 203 the delay cycle time based on the rate of the GFP data stream, then delaying the GFP data stream with the Core Header and Payload Header removed by the determined delay cycle time such that, when the eop signal turns from valid to invalid, the bit corresponding to the delayed GFP frame is the starting position of the FCS field. The delay cycle time is equal to 8 divided by the rate of the GFP data stream and multiplied by the number of the bytes of the FCS field. For example, if the rate of the GFP data stream is 8 bps (8 bit/second), and the FCS field occupies 4 bytes, then the delay cycle time is 4 clock cycles.

Figure 3:
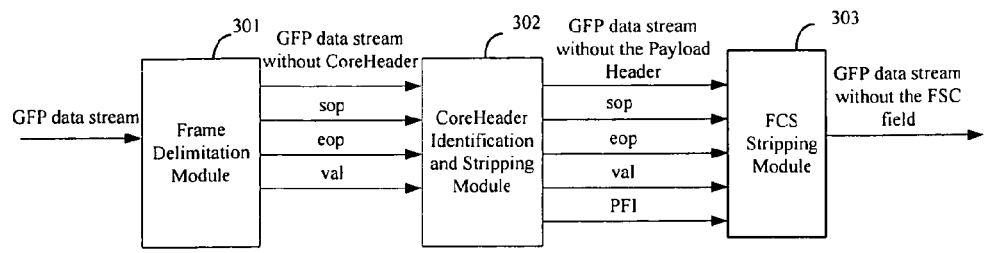
FIG. 3 is a schematic diagram illustrating the structure of the apparatus according to an embodiment of the present invention.

As shown in FIG. 3, based on the above method, the apparatus according to an exemplary embodiment of the present invention can include three parts: a Frame Delimitation Module 301, a Core Header Identification and Stripping Module 302, and an FCS Stripping Module 303. In this embodiment, the Frame Delimitation Module 301 is used for delimiting the GFP frame, removing the Core Header field and generating the signals of sop, eop and val, indicating the head of the frame, the end of the frame and whether the frame data is valid, respectively, and then transmitting the data stream and the frame indication signals to the FCS self-recognition related module 302. The Core Header Identification and Stripping Module 302 can include a PFI Extracting Module and a Payload Header Stripping Module, which are used for removing the Payload Header of the GFP frame, extracting the PFI information at the same time, and then transmitting the GFP frame data stream accompanied by the extracted PFI information to the FCS Stripping Module 303. The FCS Stripping Module 303 is for removing the FCS field based on the indication of the accompanying PFI information.

The apparatus in accordance with an embodiment of the present invention as shown in FIG. 3 can work as follows:

The Frame Delimitation Module receives a data stream from the exterior module, such as a data stream from a Synchronous Digital Hierarchy (SDH)/Synchronous Optical Network (SONET) or other transmission networks. At this time, GFP frames in the data stream are intact and have no indications of frame head or frame end. The Frame Delimitation Module removes the Core Header field of a GFP frame, generates the signals of sop, eop and val, and inputs the GFP frame without the Core Header field and the generated signals of sop, cop and val to the Core Header Identification and Stripping Module. The Core Header Identification and Stripping Module removes the Payload Header of the GFP frame based on the signals of sop, cop and val, extracts the PFI information, and transmits the PFI information and the frame data stream to the FCS Stripping Module at the same time. After receiving the data stream accompanied by the PFI information, the FCS Stripping Module judges whether the PFI information is valid, and, if yes, finds the FCS field and removes it, otherwise, completes the procedure.

Figure 4:
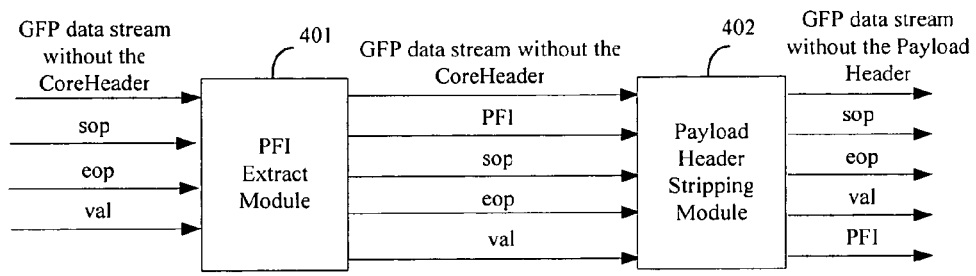
FIG. 4 is a schematic diagram illustrating the structure of the Core Header Identification and Stripping Module according to an embodiment of the present invention.

The working process of the Core Header Identification and Stripping Module and the FCS Stripping Module is hereinafter described in detail:

As shown in FIG. 4, the Core Header Identification and Stripping Module can further includes a PFI Extracting Module 401 and a Payload Header Stripping Module 402. The PFI Extracting Module 401 is used for receiving the signals of sop, eop and val and the GFP data stream with the Core Header field removed, and outputting the GFP data stream with accompanying signals of sop, eop and val as well as the PFI to the Payload Header Stripping Module 402. The Payload Header Stripping Module 402 is used for receiving the GFP data stream as well as the accompanying signals of the PFI, sop, eop and val, removing the Payload Header of the GFP frame, and outputting to the FCS Stripping Module the GFP data stream with the Payload Header removed as well as the accompanying signals including the PFI, sop, eop and val.

It shall be noted that since the Core Header Identification and Stripping Module receives the delimited GFP frame and the sop, eop and val signals which indicate the head of the frame, the end of the frame and whether the data stream is valid, respectively, the sop signal will be aligned with the first byte of the GFP frame after the Core Header field of the GFP frame is removed. At this time, the first byte of the GFP frame is the Type field, and the fourth bit of Type field is the PFI information. Therefore, when the sop signal is valid, the information at the fourth bit is extracted. Then a PFI signal accompanying the GFP frame is generated based on the extracted PFI information.

Figure 5:
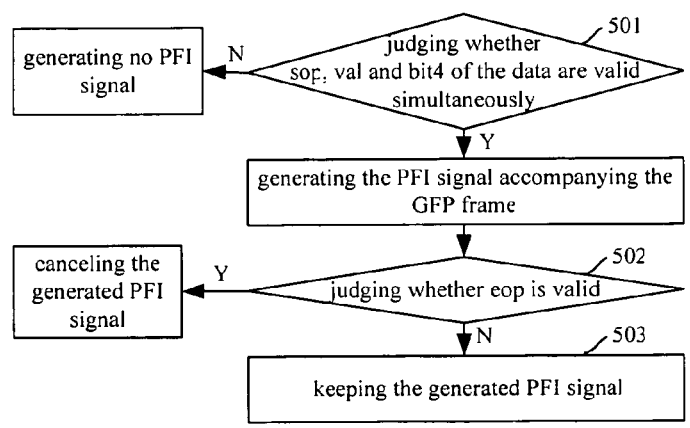
FIG. 5 is a flow chart illustrating generating a PFI by the Core Header Identification and Stripping Module according to an embodiment of the present invention.

As shown in FIG. 5, the process of the Core Header Identification and Stripping Module generating a PFI signal according to an embodiment of the present invention can include the following steps:

Step 501: judging whether the signals of sop and val as well as bit4 of the data are valid simultaneously, and, if yes, generating the PFI signal accompanying the GFP frame, and proceeding to Step 502, otherwise, generating no PFI signal;

Step 502: judging whether eop is valid, and, if yes, canceling the generated PFI signal; otherwise, proceeding to Step 503; and Step 503: keeping the generated PFI signal.

Figure 6:
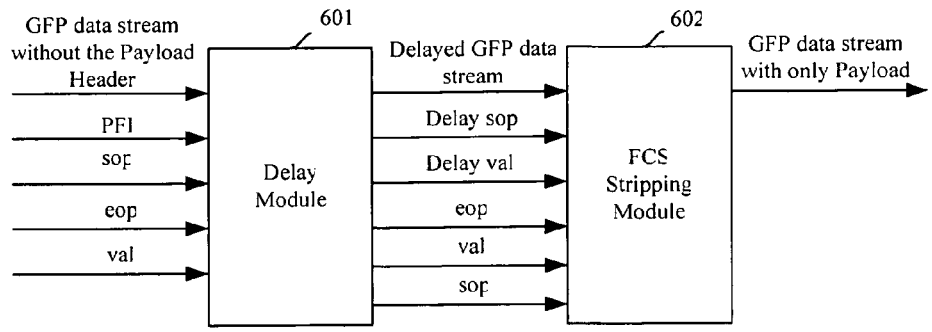
FIG. 6 is a schematic diagram illustrating the structure of the FCS Stripping Module according to an embodiment of the present invention.

As shown in FIG. 6, the FCS Stripping Module can further include a Delay Module 601 and an FCS field Stripping Module 602. The Delay Module 601 is connected with the FCS Stripping Module 602 and is used for receiving the GFP data stream with the Payload Header removed and accompanied by the signals including the PFI information, sop, eop and val, and outputting the delayed GFP data stream and delayed sop and val signals. The FCS field Stripping Module 602 is used for receiving the GFP data stream with the Payload Header removed and accompanied by the signals including the PFI information, sop, eop and val, and receiving the delayed GFP data stream and the delayed sop and val signals. When the PFI is valid, and when eop turns from valid to invalid, the FCS field Stripping Module 602 takes the bit corresponding to the delayed GFP frame as the starting position of the FCS field, and then removes the field with the same number of bits as the FCS field after the starting position.

Figure 7:
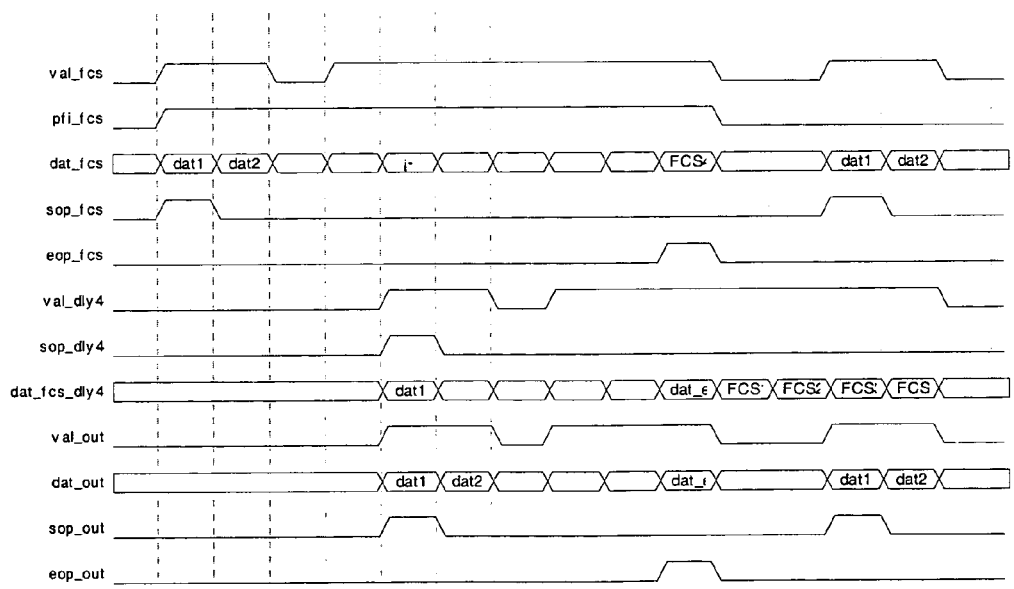
FIG. 7 is a diagram illustrating the operation timing of the FCS Stripping Module according to an embodiment of the present invention.
Figure 8:
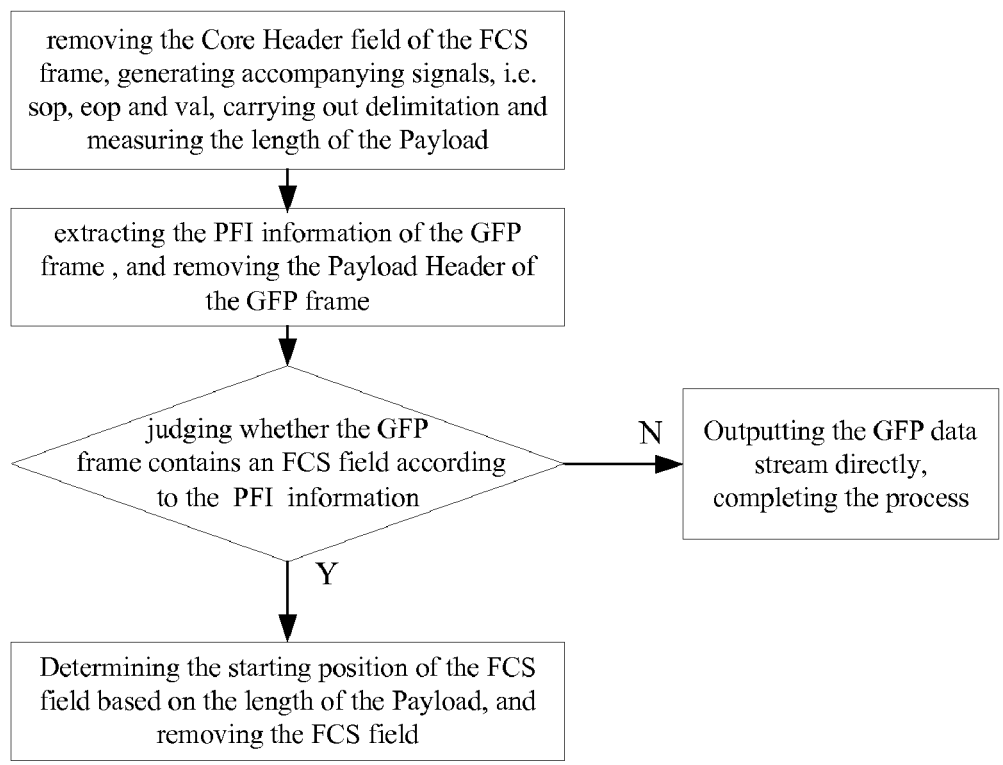
Figure 9:
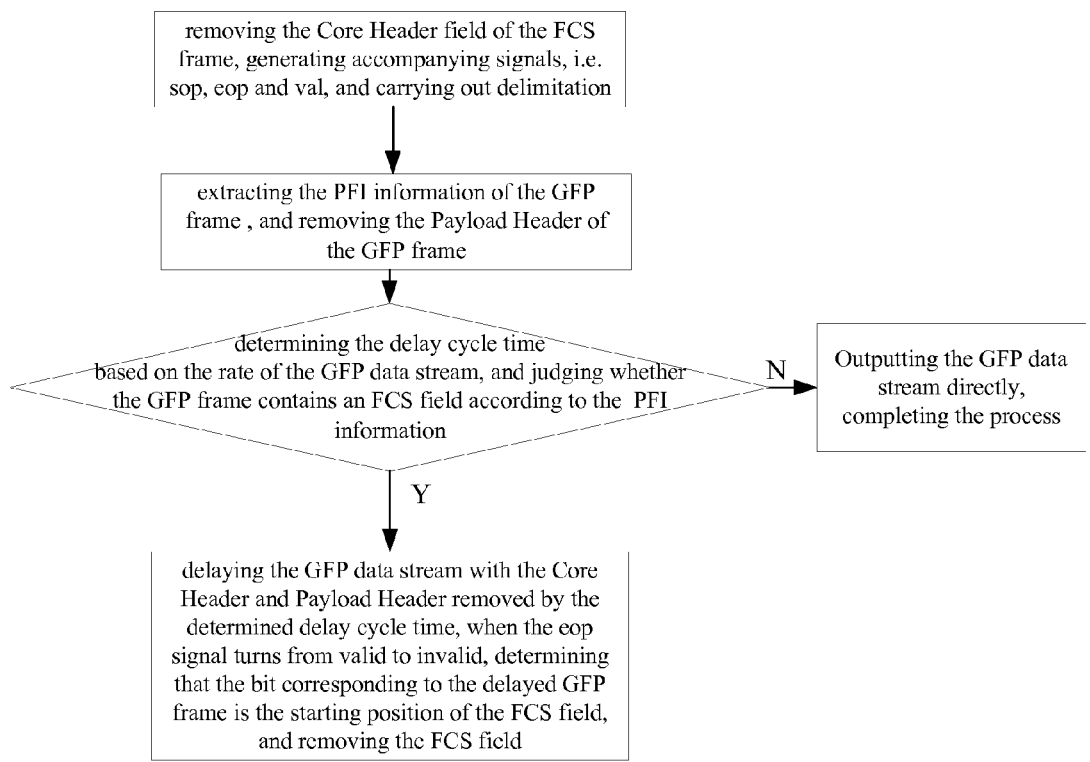

The operation consequence of the FCS Stripping Module is shown in FIG. 7 and is described hereinafter by taking two consecutive frames in a GFP data stream at the rate of 8 bps as an example. Here, the accompanying PFI signal of the first frame is valid, i.e., there is an FCS field that needs to be removed. The PFI signal accompanying the second frame is invalid, i.e., no FCS field needs to be removed. In FIG. 7, val_fcs, pfi_fcs, dat_fcs, sop_fcs, eop_fcs are input signals from the Core Header Identification and Stripping Module, representing the val, PFI information, GFP data stream, the information of the frame head and the frame end; val_dly4, sop_dly4, dat_fcs_dly4 are the signals of val_fcs, sop_fcs, and dat_fcs after a delay of four clock cycles; val_out, dat_out, sop_out, eop_out are the output signals of the FCS Stripping Module.

Here, since the FCS field is the last four bytes of the GFP frame, i.e., the sixth, seventh, eighth and ninth byte of the GFP frame, the FCS Stripping Module delays the received signal for four clock cycles. When the accompanying PFI signal of the first frame received by the FCS Stripping Module is valid, and when the eop_fcs signal turns into invalid from valid, the dat_fcs_dly4 signal is extracted, and the FCS field is removed, since four consecutive clock cycles of the dat_fcs_dly4 signal constitute the FCS field.

Next, since the accompanying PFI of the second frame is invalid, the FCS Stripping Module directly extracts the dat_fcs signal to output.

The skilled artisan will appreciate that the Frame Delimitation Module may further include a Payload Length Measuring Module connecting with the Core Header Identification and Stripping Module, and can be used for receiving the GFP data stream and measuring the payload length of the GFP frame. In this embodiment, a the Core Header Identification and Stripping Module can further include a Payload Length Transfer Device, which is used to transfer the payload length of the GFP frame outputted by the Payload Length Measuring Module to the FCS Module. When the FCS Module receives the GFP data stream, the FCS field starting position is directly determined based on the Payload length.

The foregoing description is directed to exemplary embodiments of the present invention. Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. An apparatus for recognizing a Frame Check Sequence (FCS) in Generic Framing Procedure (GFP) encapsulation mode, comprising: a Frame Delimitation Module, a Frame Header Identification & Stripping Module and an FCS Stripping Module, wherein, the Frame Delimitation Module is used for receiving GFP data stream, removing the Core Header field of the GFP frame, generating the delimiting signals indicating the head of the frame, the end of the frame and whether the frame data is valid, respectively, and outputting to the Core Header Identification and Stripping Module the GFP data stream accompanied by the delimiting signals with the Core Header field removed;

the Core Header Identification and Stripping Module is used for removing the Payload Header of the GFP frame, generating a Payload FCS Identification (PFI) signal indicating whether the GFP frame contains an FCS field according to a sop signal in the delimiting signals indicating the head of the frame, and outputting to the FCS Stripping Module the GFP data stream accompanied by the PFI signal with the Payload Header removed; and the FCS Stripping Module is used for judging whether the GFP frame contains an FCS field according to the PFI signal received from the Core Header Identification and Stripping Module, if yes, determining the position of the FCS field according to the PFI signal and the delimiting signals, and removing the FCS field.

2. The apparatus according to claim 1, wherein the Core Header Identification and Stripping Module farther comprises:

a PFI Extracting Module, used for receiving from the Frame Delimitation Module the GFP data stream accompanied by the delimiting signals with the Core Header field removed, generating the PFI signal according to the sop in the delimiting signals and outputting to the Payload Header Stripping Module the GFP data stream with the Core Header field removed and accompanied by the PFI signal and the delimiting signals; and a Payload Header Stripping Module, used for removing the Payload Header of the GFP frame and outputting the GFP data stream with the Payload Header field removed and accompanied by the PFI signal and the delimiting signals.

3. The apparatus according to claim 1, wherein the FCS Stripping Module further comprises:

a Delay Module, used for receiving from the Frame Header Identification and Stripping Module the GFP data stream with the Payload Header field removed and accompanied by signals including the PFI signal and the delimiting signals, and outputting the delayed GFP data stream and delayed delimiting signals of sop and val to the FCS Stripping Module, wherein the clock cycle of the delay is determined by the length of the FCS field, wherein the sop signal is for indicating the head of the frame, and the val is for indicating whether the frame data is valid; and an FCS Stripping Module, used for taking the bit corresponding to the delayed GFP data stream as the starting position of the FCS field when the PFI signal is valid and the delimiting signal eop turns from valid to invalid, and removing the corresponding field with the same number of bits as the FCS field from said starting position.

4. The apparatus according to claim 1, wherein the Frame Delimitation Module further comprises a Payload Length Measuring Module connected with the Frame Header Identification and Stripping Module and used for receiving the GFP data stream and measuring the payload length of the GFP frame; and the Frame Header Identification and Stripping Module further comprises a Payload Length Transfer Device used for transferring the payload length of the GFP frame outputted from the Payload Length Measuring Module to the FCS Stripping Module.

5. A method for recognizing a Frame Check Sequence (FCS) in Generic Framing Procedure (GFP) encapsulation mode, comprising:

A. removing, by an apparatus receiving a GFP frame, the Core Header field of a GFP frame in a received GFP data stream, generating the delimiting signals with the removed data stream, indicating the head of the frame, the end of the frame and whether the frame data is valid, respectively, and completing the delimitation of the GFP frame;

B. extracting, by an apparatus receiving a GFP frame, the Payload FCS Identification (PFI) information from the GFP frame according to the delimiting signals and removing the Payload Header of the GFP frame; and C. judging, by an apparatus receiving a GFP frame, whether the GFP frame contains an FCS field according to the extracted PFI information in Step B, if yes, determining the starting position of the FCS field and removing the FCS field; otherwise, outputting the GFP data stream directly and ending the current process.

6. The method according to claim 5, wherein, after determining that the GFP frame contains an FCS field, said step of determining the starting position of the FCS field comprises:

C11. determining the delay cycle time according to the rate of the GFP data stream; and C12. delaying the GFP data stream without the Core Header field and the Payload Header field by the delay cycle time determined in Step C11, and when the eop signal turns from valid into invalid, taking the bit corresponding to the delayed GFP frame as the staffing position of the FCS field, wherein the eop signal is one of the delimiting signals and is for indicating the end of the frame.

7. The method according to claim 6, wherein said delay cycle time equals to 8 divided by the rate of the GFP data stream and multiplied with the number of the bytes of the FCS field.

8. The method according to claim 5, wherein Step A farther comprises:

measuring the payload length of the GFP frame and the position of FCS field is determined according to the payload length.

9. The method according to claim 5, wherein said step of extracting PFI information from the GFP frame in Step B further comprising:

B1. judging whether the sop signal and val signal and bit4 of the GFP frame are valid simultaneously, if yes, generating a PFI signal accompanying the GFP frame and proceeding to Step B2; otherwise, generating no PFI signal and ending the current process, wherein the sop signal is one of the delimiting signals and is for indicating the head of the frame, and the val is one of the delimiting signals and is for indicating whether the frame data is valid; and B2. judging whether the eop signal is valid, if yes, canceling the generated PFI signal and ending the current process; otherwise, keeping the generated PFI signal and proceeding to Step C, wherein the eon signal is one of the delimiting signals and is for indicating the end of the frame.

* * * * *

UNITED STATES PATENT AND TRADEMARK OFFICE
CERTIFICATE OF CORRECTION

PATENT NO.        : 7,630,399 B2
APPLICATION NO.   : 11/350148
DATED             : December 8, 2009
INVENTOR(S)       : Qiuping Shang It is certified that error appears in the above-identified patent and that said Letters Patent is hereby corrected as shown below:

Claim 2, Column 7, Line 29 reads "Header Identification and Stripping Module ~~farther~~ com-"
and should read "Header Identification and Stripping Module further com-"

Claim 6, Column 8, Line 35 reads "sponding to the delayed GFP frame as the ~~staffing~~ posi-"
and should read "sponding to the delayed GFP frame as the starting posi-"

Claim 8, Column 8, Line 43 reads "The method according to claim 5, wherein Step A ~~farther~~"
and should read "The method according to claim 5, wherein Step A further"

Claim 9, Column 8, Line 63 reads "and proceeding to Step C, wherein the ~~eon~~ signal is one"
and should read "and proceeding to Step C, wherein the eop signal is one"

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO.       : 7,630,399 B2                                          Page 1 of 1
APPLICATION NO. : 11/350148
DATED            : December 8, 2009
INVENTOR(S)      : Qiuping Shang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 935 days.

Signed and Sealed this

Twenty-first Day of December, 2010

David J. Kappos
*Director of the United States Patent and Trademark Office*